United States Patent
Avraham et al.

(10) Patent No.: US 7,003,620 B2
(45) Date of Patent: Feb. 21, 2006

(54) APPLIANCE, INCLUDING A FLASH MEMORY, THAT IS ROBUST UNDER POWER FAILURE

(75) Inventors: Meir Avraham, Rishon Lezion (IL); Menahem Lasser, Kohav Yair (IL)

(73) Assignee: M-Systems Flash Disk Pioneers Ltd., Kfar Saba (IL)

( * ) Notice: Subject to any disclaimer, the term of this patent is extended or adjusted under 35 U.S.C. 154(b) by 323 days.

(21) Appl. No.: 10/303,793

(22) Filed: Nov. 26, 2002

(65) Prior Publication Data
US 2004/0103238 A1 May 27, 2004

(51) Int. Cl.
*G06F 12/16* (2006.01)

(52) U.S. Cl. .................. 711/103; 711/102; 711/104; 714/14; 714/24

(58) Field of Classification Search .............. 713/324, 713/340; 711/118, 143, 170; 365/229
See application file for complete search history.

(56) References Cited

U.S. PATENT DOCUMENTS

| 5,438,549 | A | * | 8/1995 | Levy ........................... 365/229 |
| 5,519,663 | A | * | 5/1996 | Harper et al. ................ 365/229 |
| 5,606,529 | A | | 2/1997 | Honma et al. |
| 5,799,200 | A | * | 8/1998 | Brant et al. .................. 713/340 |
| 6,026,027 | A | | 2/2000 | Terrell, II et al. |
| 6,295,577 | B1 | * | 9/2001 | Anderson et al. ........... 711/113 |
| 6,418,506 | B1 | | 7/2002 | Pashley et al. |
| 2002/0156983 | A1 | * | 10/2002 | Jones et al. ................. 711/143 |

FOREIGN PATENT DOCUMENTS

WO    WO 01/22205    3/2001

* cited by examiner

*Primary Examiner*—T Nguyen
(74) *Attorney, Agent, or Firm*—Mark M. Friedman

(57) ABSTRACT

An appliance that includes a host device and a memory unit with a primary memory, and a method of operating the appliance. According to one aspect of the appliance, the primary memory is nonvolatile and the memory unit also includes a volatile memory a power sensor and a controller. When the power sensor detects interruption of power to the memory unit, the controller copies data selectively from the volatile memory to the primary memory. Power for this copying is provided by a secondary power source such as a battery or a capacitor. According to another aspect of the appliance, the appliance includes primary and secondary power sources, and the memory unit also includes a charge pump whose functions include both boosting power from the primary source for the primary memory and charging the secondary source.

26 Claims, 5 Drawing Sheets

APPLIANCE, INCLUDING A FLASH MEMORY, THAT IS ROBUST UNDER POWER FAILURE

FIELD AND BACKGROUND OF THE INVENTION

The present invention relates to processor-based appliances and more particularly, to a processor-based appliance, whose memory unit includes both a nonvolatile memory such as a flash memory and a volatile cache memory that is robust under sudden power failure.

Flash memory is in wide use as a cost-effective nonvolatile memory. Its inherent weaknesses are in the need to erase relatively large blocks of data all together prior to writing on them, the need to use an increased level of electrical voltage for such an erase, and the relatively limited number of writing cycles to the memory before the memory wears and becomes unusable. In response to these weaknesses, there have been developed techniques for caching data prior to writing them to the flash memory, boosting the voltage for writing and erasing data, and increasing the longevity of the memory by evening the wear over the memory blocks. See, for example, Honma et al., U.S. Pat. No. 5,606,529, Terrell, II et al., U.S. Pat. No. 6,026,027, and Pashley et al., U.S. Pat. No. 6,418,506, which patents arc incorporated by reference for all purposes as if fully set forth herein, for prior art methods of caching data in a volatile memory prior to writing the data to a flash memory.

Flash memory is used in cooperation with a host device, i.e., a computer or a computerized device such as a digital camera, an electronic telephone, a MP3 player, etc. In some cases the flash memory is permanently embedded in the host device, and in other cases the flash memory is detachable. There is a lot of flexibility in distributing tasks between the flash memory module and the host device. For instance, caching the data, boosting the power or evening the wear could be services provided by the host device to the flash memory module, or alternatively these services can be implemented by components and logic integrated into the flash memory unit, or a combination of the two approaches can be used. In practice, because flash memory design has become the expertise of its providers and designers, and because with detachable modules a specific memory unit may need to interface with host devices of various providers and designs. it has become common to integrate the components specific to the flash memory unit into that unit, and to rely minimally on specialized services provided by the host devices. In particular, the charge pump circuitry for boosting the voltage is often embedded within the physical chip containing the nonvolatile memory module.

Thus, the common design of flash memory units involves receiving basic power supply (typically, 3.3V) from the host device and exchanging data streams between the host device and the flash memory unit. Caching and voltage-boosting are commonly done using components and logic included in the flash memory unit.

In case of failure of the power supplied from the host device to the flash memory unit, the content of the cache are lost. In critical applications, the provider of the host device backs up the power supply, for instance by using an uninterrupted power supply (UPS) or a battery backup. In other cases the designer of the flash memory unit must carefully select the data cached in the unit's volatile memory in order to minimize the damage in case of power interruption. For instance, critical data related to the file allocation table (FAT) are written immediately to the non-volatile memory, without being cached, in order to avoid loss of the entire data stored in the flash memory in case of power failure. These critical data change frequently, and so must be written frequently to the non-volatile memory, leading to increased writing cycles to the flash memory, which is time consuming and increases the wear of the flash memory.

Thus, according to the prior art there is a conflict between the need to increase the amount of frequently-accessed data cached within a flash memory unit in order to increase efficiency and reduce wear, and the need to reduce such caching for minimizing the damage in case of failure in the supply of power from the host device to the flash memory unit.

SUMMARY OF THE INVENTION

It is an object of the present invention to provide a flash memory unit that includes a built-in backup feature, to allow reliably caching data while eliminating data loss in case of interruption in the supply of power from a host device.

The present invention is based on integrating a power backup feature into the flash memory unit or next to the flash memory unit in the host device. Upon detecting a failure in the supply of power from the host device to the flash memory unit, the power backup feature takes over, and some or all of the contents of the cache are automatically and selectively copied from the volatile memory to the nonvolatile memory. This session of detection of the power failure and saving of the cached contents requires only a very small amount of electrical energy, and can therefore rely upon commercial components of small size that can be seamlessly integrated into the design of the flash memory unit, or added to the host device.

In one embodiment of the present invention, the backup power supply uses a battery for simple and efficient power supply. Alternatively, a capacitor is used to store the required energy reserve, offering a long life, maintenance-free configuration. To store sufficient energy reserve while minimizing the capacitor's size, the capacitor preferably is charged from the boosted power level, which exists in the flash memory unit for the erasing operations on the non-volatile memory.

In some cases, the design of the flash memory unit requires moving some of the more voluminous parts, such as the backup battery or the capacitor, to the host device. In such a case, the flash memory unit includes the power-boosting circuit, while the reserve electrical energy is provided from a battery or power source included in the host device.

Therefore, according to the present invention there is provided a method of operating an appliance that includes a host device and a memory unit, the memory unit including a nonvolatile memory, the method including the steps of: (a) providing a volatile memory for storing data; and (b) upon interruption of power to the memory unit, selectively writing the data then stored in the volatile memory to the nonvolatile memory.

Furthermore, according to the present invention there is provided an appliance including: (a) a memory unit including: (i) a nonvolatile memory; (ii) a volatile memory for storing data; (iii) a power sensor for receiving and detecting power supplied by a primary power source external to the memory unit, the power being for powering the memory unit; and (iv) a controller for, upon receiving an indication from the power sensor of an interruption of the power, selectively writing the data then stored in the volatile memory to the nonvolatile memory.

Furthermore, according to the present invention there is provided an appliance including: (a) a primary power source; (b) a secondary power source; and (c) a memory unit that receives power from the primary power source at a first voltage and that includes: (i) a primary memory, and (ii) a charge pump for: (A) boosting the power from the primary power source to a second voltage for the primary memory, and (B) charging the secondary power source.

Furthermore, according to the present invention there is provided a memory device including: (a) a nonvolatile memory, a portion whereof is reserved exclusively for copying thereto at least a portion of data stored in the memory device upon interruption of power from a power source external to the memory device.

The appliance of the present invention consists of a host device and a memory unit that includes a primary memory.

According to a first aspect of the present invention, the primary memory is a nonvolatile memory; and the memory unit also includes a volatile memory, a power sensor for receiving and detecting the power that is provided to the memory unit by a primary power source outside the memory unit, and a controller that controls the memory unit. When the power sensor detects an interruption of primary power, the power sensor notifies the controller of the interruption of power. The controller then selectively writes, from the volatile memory to the nonvolatile memory, at least a portion of the data that is then stored in the volatile memory.

In one embodiment of the present invention, the volatile memory is a cache memory in which data are cached prior to being written to the nonvolatile memory, and "selective" writing means writing at least a portion of the cached data to the nonvolatile memory, but only data of one class, either system data or user data. If the data class that is written to the nonvolatile memory is system data, then the data that is written to the nonvolatile memory may include file allocation data, a copy of a memory buffer that is used by the host device to accumulate user data, a description of the status of the host device, and/or an identification of the operation that was interrupted by the interruption of primary power.

In a second embodiment of the present invention, the volatile memory is a cache memory in which data are cached prior to being written to the nonvolatile memory, and "selective" writing means writing only a portion of the cached data to the nonvolatile memory. The portion of the data that is selectively written to the nonvolatile memory may include only user data, or alternatively may include only system data. The system data that is selectively written to the nonvolatile memory may include file allocation data, a copy of a memory buffer that is used by the host device to accumulate user data, a description of the status of the host device, and/or an identification of the operation that was interrupted by the interruption of primary power.

In a third embodiment of the present invention, the volatile memory is used to store system data, and "selective" writing means that data are written from the volatile memory to the nonvolatile memory only when primary power is interrupted. At least a portion of the data then stored in the volatile memory then is written to the nonvolatile memory. The system data then written to the nonvolatile memory may include file allocation data, a copy of a memory buffer that is used by the host device to accumulate user data, a description of the status of the host device, and/or an identification of the operation that was interrupted by the interruption of primary power.

Preferably, the primary power source is in the host device.

Preferably, either the memory unit or the host device includes a secondary power source for powering the writing of the data from the cache memory to the nonvolatile memory in the event of an interruption of primary power. Preferably, the secondary power source includes a battery. Alternatively, the secondary power source includes a capacitor.

Preferably, upon resumption of primary power to the memory unit, the data that was written from the volatile memory to the nonvolatile memory when power was interrupted is written back from the nonvolatile memory to the volatile memory.

Preferably, the volatile memory and the controller are fabricated on a common substrate. Also preferably, the nonvolatile memory and the volatile memory are fabricated on a common substrate. Typically, fabrication on the same substrate is effected by fabricating the volatile memory and the controller, or the volatile and nonvolatile memories, in the same integrated circuit.

Preferably, a specific portion of the nonvolatile memory is reserved exclusively to receive the data that is selectively written from the volatile memory. In this context, "exclusivity" means that the reserved portion of the nonvolatile memory is written to only in response to the interruption of power, and is not written to under any other circumstances. The scope of the first aspect of the present invention also includes an independent memory device in which, upon interruption of external power, data stored in the memory device (for example, in a volatile memory) is copied, selectively or unselectively, to a portion of a nonvolatile memory that is reserved exclusively for this purpose.

According to a second aspect of the present invention, the primary power source and the secondary power source both are part of the appliance, and the memory unit also includes a charge pump that serves two purposes: boosting the primary power from a first voltage to a higher second voltage for the primary memory, and charging the secondary power source.

Preferably, the secondary power source includes a battery. Alternatively, the secondary power source includes a capacitor. Preferably, the secondary power source is in the memory unit. Alternatively, both power sources are in the host device.

Preferably, the secondary power source is operative to provide secondary power to the primary memory at the second voltage.

Preferably, the primary memory is nonvolatile, and the memory unit also includes a volatile cache memory for caching data prior to writing the data to the primary memory, a power sensor for receiving and detecting the primary power, and a controller that, upon receiving an indication from the power sensor of an interruption in the primary power, uses secondary power to write to the primary memory at least a portion of the data then stored in the cache memory. Most preferably, the volatile cache memory and the controller are fabricated on a common substrate.

The Honma et al. patent cited above also teaches the provision of a battery to provide backup power for copying cached data from a volatile cache to a nonvolatile flash memory when external power is turned off. Unlike the present invention, all of the cached data are copied, blindly and unselectively, to the flash memory. In addition, the battery is charged from the general power supply, and not from the flash memory's charge pump.

SIMTEK Corporation of Colorado Springs Colo., USA, produces a nonvolatile SRAM device in which every conventional, volatile SRAM element is backed up by a corresponding nonvolatile EEPROM element. In case of power failure, the contents of the volatile SRAM elements are automatically copied to the corresponding nonvolatile EEPROM elements. Power for the copying is provided by either system capacitance or a small external capacitor. As in the case of the Honma et al. patent, all of the data in the volatile SRAM elements are copied, blindly and unselectively, to the nonvolatile EEPROM elements.

Portman et al., in WO 01/22205, teach a computer system, with both a volatile memory and a nonvolatile memory, in which backup power stored in a supercapacitor array is used to power the copying of the contents of the volatile memory to the nonvolatile memory in case of external power failure. As in the case of the Honma et al. patent and the SIMTEK device, all the data in the volatile memory is copied, blindly and unselectively, to the nonvolatile memory when external power is interrupted. In addition, the upcoverter and the downconverter associated with the supercapacitor array are used only to charge and discharge the supercapacitor array, and have no connection to the normal operation of the nonvolatile memory.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an intelligent appliance that includes a host device and a memory unit, such that the memory unit is robust under failure of power from the host device.

The principles and operation of an intelligent appliance according to the present invention may be better understood with reference to the drawings and the accompanying description.

Figure 1:
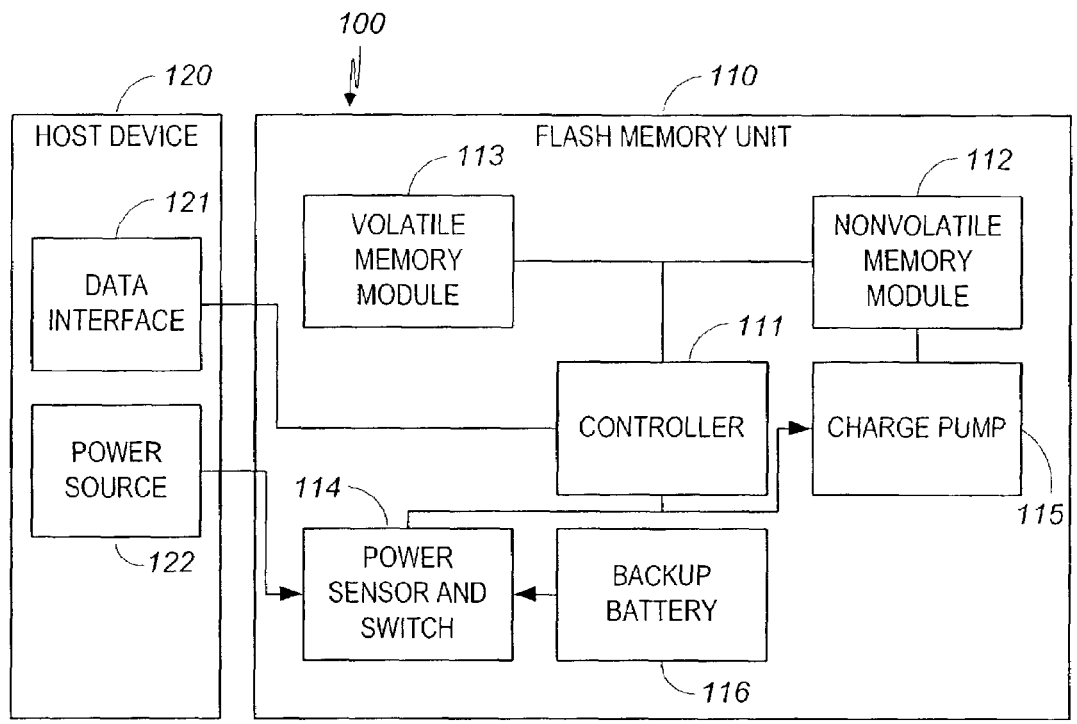
FIG. 1 is a schematic block diagram of a first preferred embodiment of the present invention.

Referring now to the drawings, reference is made to FIG. 1, which is a schematic block diagram of a preferred embodiment of an operating appliance 100 of the present invention. Operating appliance 100 includes a flash memory unit 110 connected to a host device 120. The connection can be permanent in the case that memory unit 110 is embedded in host device 120, or temporary in the case that memory unit 110 is reversibly detachable from host device 120. Host device 120 is a computerized instrument such as a personal computer, a personal digital assistant (PDA), a digital camera, a MP3 player, a mobile telephone, etc. Host device 120 contains a primary power source 122 for its own operation as well as for energizing flash memory unit 110. Host device 120 has a data interface 121 to communicate with flash memory unit 110 through a controller 111 of flash memory unit 110. Controller 111 controls reading data from and writing data to both a volatile memory module 113 and a nonvolatile memory module 112.

Data written to memories 112 and 113 can be divided into user data, which is data useful to the user provided by host device 120 via data interface 121, for instance document data generated by a word processing application, digital image captured by a digital camera, a music file, or a digitized voice recording segment; and system data, which is data generated by host device 120 and controller 111 to manage the data storage in nonvolatile memory 112, for example via file allocation tables (FAT) and other pointers and status parameters, such as a pointer, to the current address being written to in nonvolatile memory 112, which is important for resuming system operation when recovering from a power failure. The system data may also include a mirrored copy of a partial memory buffer used by host device 120 to accumulate user data, thus rescuing the content of an incomplete buffer of user data in case of power failure. Another piece of useful system data is the current status of host device 120, received continually via data interface 121, which is useful after recovery to allow flash memory unit 110 to determine whether host device 120 has resumed its operation properly upon recovery from a power failure (see FIG. 4). Yet another piece of useful system data is an identifier of the operation that was interrupted by the power failure. Examples of such an identifier include the address of a write operation that was interrupted and the address of an erase operation that was interrupted. In some cases controller 111 is programmed to buffer user data in volatile memory module 113 until the amount of data reaches the size of a block writable to nonvolatile memory module 112,. and then copy the contents of the buffer to nonvolatile memory module 112. In many cases, however, this buffering capability is redundant or can even be omitted if user data is already buffered by host 120 and is provided to controller 111 in appropriately-sized blocks, ready to be written directly to nonvolatile memory module 112. Controller 111 is also programmed to cache within volatile memory 113 system data as described above. This offers higher access speed to the system data as well as reduced wear level, especially with rapidly changing system data such as FAT, pointers and recovery parameters. The survival of this system data is critical for the survival of the entire content of non-volatile memory 112 in case of power failure which is the crux of the present invention.

In normal operation of flash memory unit 110, a power sensor and switch 114 relays electrical power arriving from primary power source 122 of host device 120, typically 3.3 volts, to controller 111. This voltage level is sufficient for the operation of controller 111 as well as for allowing controller 111 to write to and read from volatile memory module 113. However, this voltage level typically is not sufficient for erasing blocks in nonvolatile memory 112, which precedes writing to nonvolatile memory 112. Nor is this voltage level typically sufficient for writing data to nonvolatile memory 112. For this purpose,. a charoe pump 115 is used to pump-up the voltage level to typically 16V, which is supplied to nonvolatile memory module 112 for enabling erase and write operations thereon. As noted above, in modern flash integrated circuits, the charge pump typically is fabricated on the same silicon die as the flash array.

In case of a failure in the supply of primary power from primary power source 122 to power sensor and switch 114, power sensor and switch 114 detects this failure immediately, and immediately switches the incoming source of power to a backup battery 116. Thus, there is an immediate, short-term supply of electrical energy from battery 116, to rescue the cached data from volatile memory 113 and selectively write some or all of the cached data to nonvolatile memory 112. At the moment that power sensor and switch 114 detects an interruption of primary power supplied from primary power source 114, power sensor and switch 114 also notifies controller 111. Controller 111 is preprogrammed to react to such notification by selectively copying some or all of the contents of volatile memory 113 to non-volatile memory 112, and then switching off flash memory unit 110 until power is supplied to power sensor and switch 114 from primary power source 122, or from an alternative external power source of another host device, in case of a major malfunction of the original host device 120.

There are three preferred options for the selective writing. Under the first two options, volatile memory 113 is used as a cache memory in which data are cached prior to being written to non-volatile memory 112. The first option is to write data of only one class, either user data or system data, from volatile memory 113 to nonvolatile memory 112. The second option is to write some, but not all, of the data cached in volatile memory 113 to non-volatile memory 112. Under the third option, volatile memory 113 is used only to store some types of system data, such as pointers of the most recent operation, that are needed for recovery from a loss of power. When controller 111 receives notification of an interruption of primary power, controller 111 copies some or all of these system data from volatile memory 113 to non-volatile memory 112.

In some variants of appliance 100, backup battery 116 is rechargeable, and is charged from power supplied from power sensor and switch 114; in other cases battery 116 is a long-life lithium battery that does not require recharging by power sensor and switch 114.

According to the prior art, when a host device of a flash memory unit powers up, the host software program checks for an indication that the most recent use of the device was terminated by a power loss. If such an indication is present, the host runs a recovery procedure using the data stored in the nonvolatile memory prior to power loss. Because the present invention saves data from volatile memory 113 to nonvolatile memory 112 in the event of loss of power, the present invention allows two other alternative recovery procedures that include copying of data from nonvolatile memory 112 back to volatile memory 113. Specifically, when power sensor and switch 114 detects the renewal of power supply from an external power source, power sensor and switch 114 reenergizes controller 111 to read the saved system data from nonvolatile memory 112 and to copy the saved system data to volatile memory 113 to allow resuming the operation of flash memory unit 110 from the instance of interruption. However, if unit 110 has been detached from the original host device 120 and attached to an alternative host device, or if, as a result of the power interruption, host device 120 switches to a different operation than the interrupted one controller 111 uses the system data saved on non-volatile memory 112 to recover from the power failure, to amend and update its file allocation tables (FAT) and status flags to a normal initial state, and to be ready for a new service cycle.

Figure 1A:
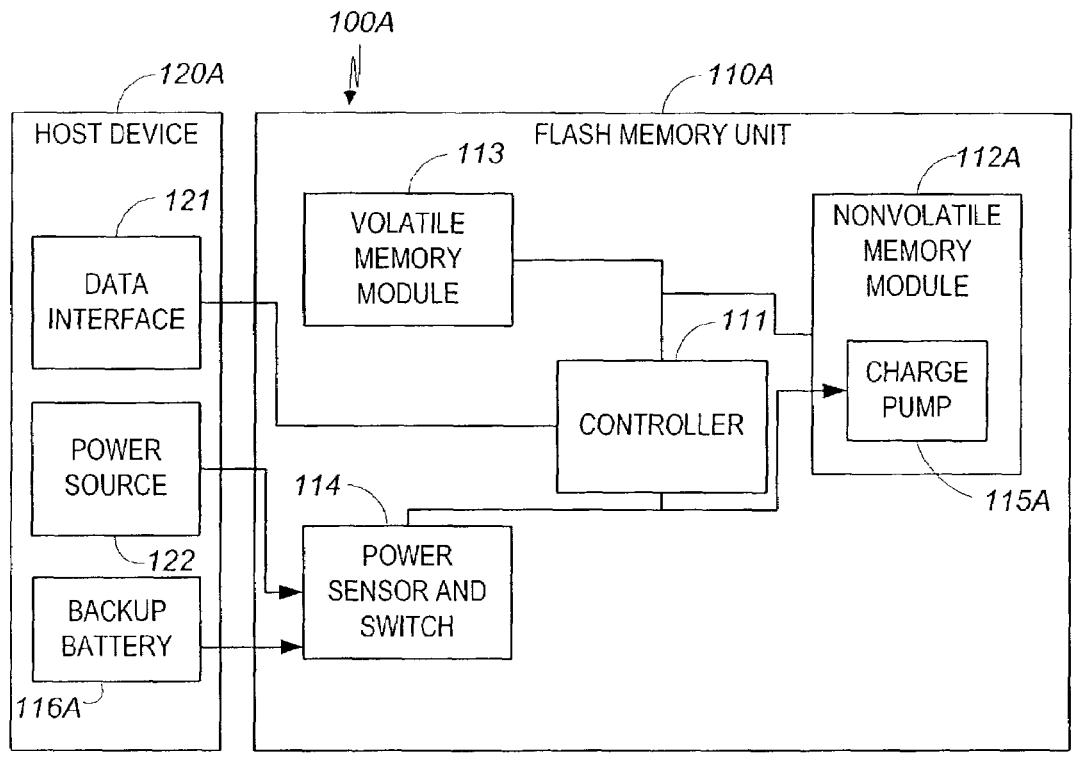
FIG. 1A is a schematic block diagram of a variation of the first preferred embodiment of the present invention.

FIG. 1A illustrates a variation 100A of preferred embodiment 100 described above. For design considerations, backup battery 116 of FIG. 1 is moved from flash memory unit 110, now becoming flash memory unit 110A, to host device 120A to become backup battery 116A. Batteries 116 and 116A have identical functionalities, and differ only in their location and the appropriate changes in their physical wiring. Charge pump 115A has been moved, for the sake of illustration, to become part of nonvolatile memory 112A, as is the case in many practical designs of such components. The other elements of FIGS. 1 and 1A are identical. The combination of host device 120A with flash memory unit 110A now becomes operating appliance 100A.

Figure 2:
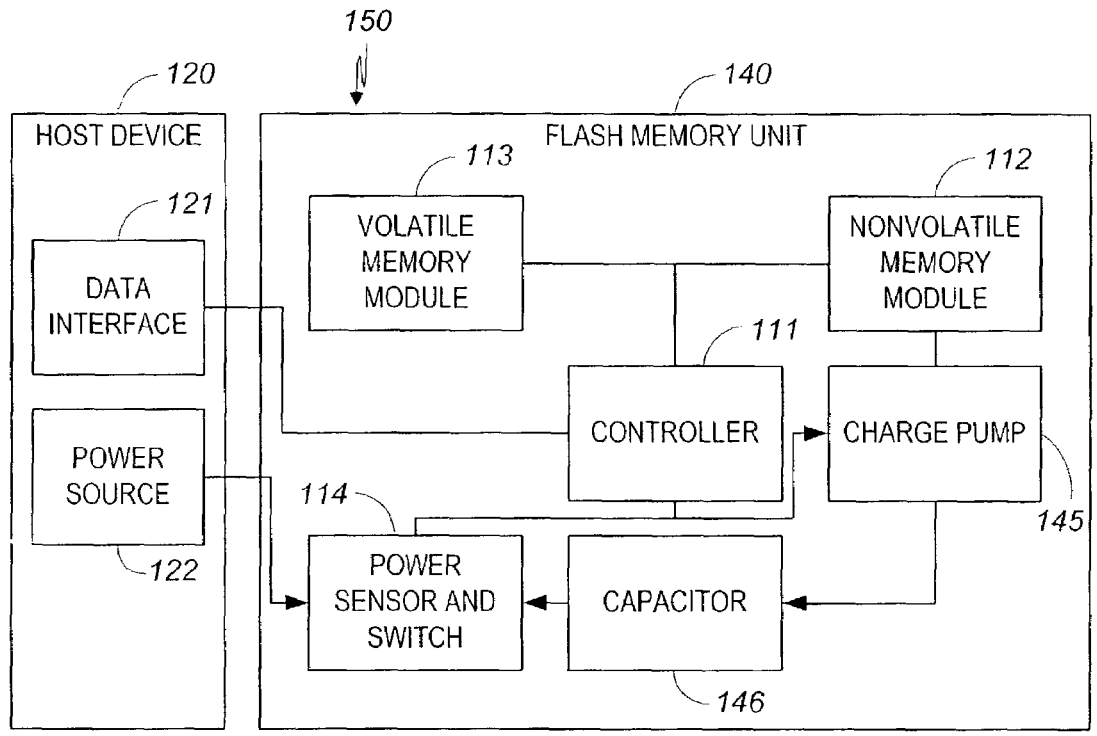
FIG. 2 is a schematic block diagram of a second preferred embodiment of the present invention.

FIG. 2 illustrates an alternative preferred embodiment to that of FIG. 1. The operating appliance of FIG. 2 is designated by reference numeral 150. Backup battery 116 is replaced in FIG. 2 by a capacitor 146 to supply the reserve power in case of interruption of the power supply from host device 120. Capacitor 146 is continually charged, preferably from a charge pump 145, which, in this embodiment serves both for charging of capacitor 146, as well as for writing to nonvolatile memory 112 as before. Charging capacitor 146 from charge pump 145 instead of from power source 122 allows capacitor 146 to be charged to a higher voltage than the voltage provided by power source 122, thus storing more energy in capacitor 146 and consequently increasing the time during which operation of flash memory using capacitor 146 can continue following interruption of power from power source 122. It should be noted that in case of interruption in the power supplied from primary power source 122, power supplied by capacitor 146 to power switch 114 serves also to energize charge pump 145 for enabling the coming cycle of erasing and writing to nonvolatile memory module 112. The other components and functions in FIG. 2 are similar to those described in respect to FIG. 1.

Figure 2A:
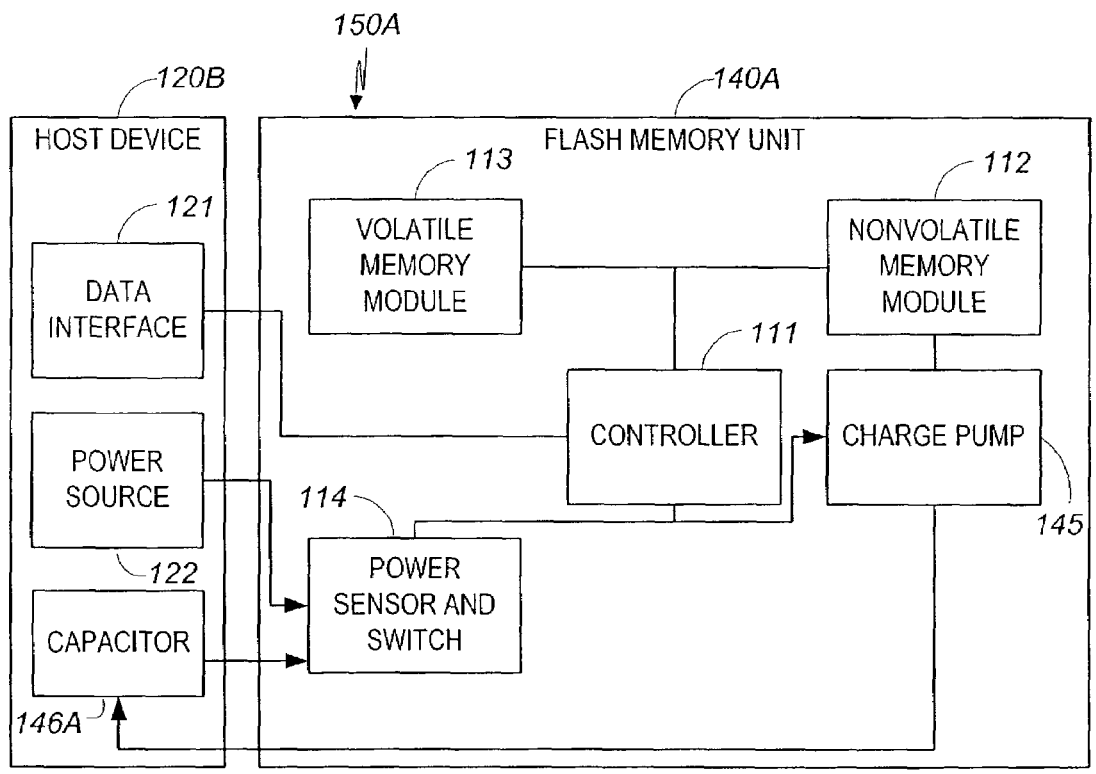
FIG. 2A is a schematic block diagram of a variation of the second preferred embodiment of the present invention.

FIG. 2A illustrates a variation 150A of preferred embodiment 150 described above. For design considerations, capacitor 146 of FIG. 2 is moved from flash memory unit 140, now becoming flash memory unit 140A, to host device 120B to become capacitor 146A. Capacitors 146 and 146A have identical functionalities, and differ only in their location and the appropriate changes in their physical wiring. The other elements of FIGS. 2 and 2A are identical. The combination of host device 120B with flash memory unit 140A now becomes operating appliance 150A.

Figure 2B:
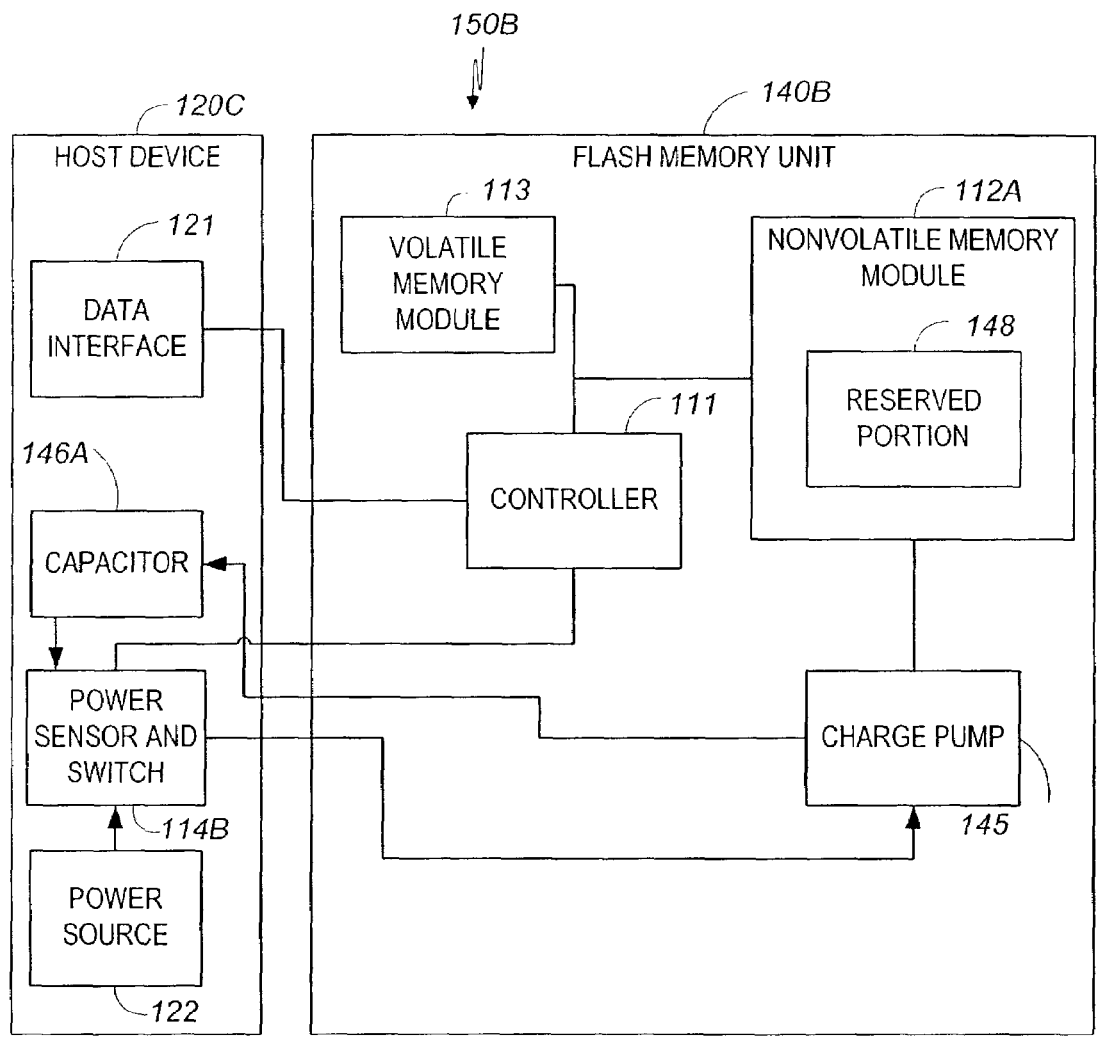
FIG. 2B is a schematic block diagram of another variation of the second preferred embodiment of the present invention.

FIG. 2B illustrates another variation 150B of the preferred embodiment described in FIG. 2A. For design considerations, power sensor and switch 114B also has been moved to host device 120C, thus reducing the content of flash memory unit 140B to volatile memory module 113, a nonvolatile memory module 112A, charge pump 145 and controller 111.

Nonvolatile memory module 112A differs from nonvolatile memory module 112 only in that a portion 148 of nonvolatile memory module 112A is reserved exclusively for selective copying of data from volatile memory module 113 in the event of an interruption of primary power. In appliances 100, 100A, 150 and 150A, the data in volatile memory module 113 are written to "normal" locations in nonvolatile memory module 112, i.e., to locations in nonvolatile memory module 112 that are used during normal operation of appliance 100. For example, a cached user sector is written to the address in nonvolatile memory module 112 to which the user sector would have been written if primary power had not been interrupted. In appliance 150B, the selectively written data are just copied directly, regardless of whether the data would have been stored in nonvolatile memory 112A in the course of normal operation of appliance 150B, and regardless of where in nonvolatile memory 112A the data would have been stored. This alternative simplifies the hardware implementation of the present invention because the task of sorting out of which data go where upon recovery is left to the recovery software.

Figure 3:
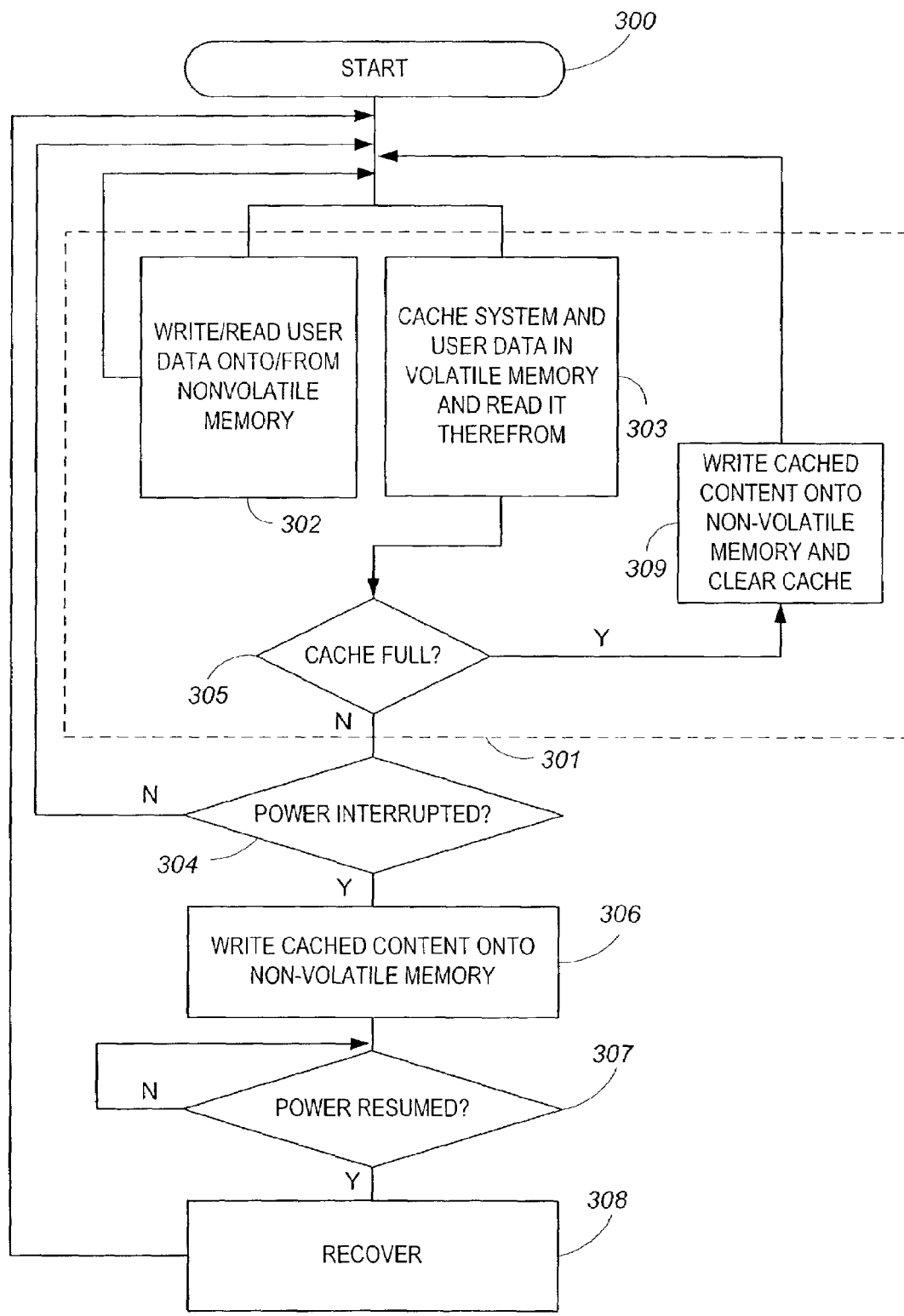
FIG. 3 is a flowchart describing the operation of the preferred embodiments of the present invention.

FIG. 3 is a flowchart that illustrates the operation of the present invention constructed according to any of FIGS. 1 through 2B. Operation starts in block 300 when host device 120/120A/120B/120C is turned on. Step 301 covers the nominal operation of the system, which includes in block 302 writing user data to non-volatile memory module 112 and/or reading user data from non-volatile memory module 112, while in block 303 system data is cached in and/or read from volatile memory module 113. Caching in block 303 may lead volatile memory module 113 to become full, which condition is examined in step 305. If volatile memory module 113 is indeed full, then in step 309 all or part of the content of volatile memory 113 are copied to nonvolatile memory 112, and the freed memory volatile space is cleared for further caching. An example of a case in which the cache is partially emptied is when user data buffered in the cache is copied to the nonvolatile memory and cleared, while system data remains in the cache.

Normal operation continues (step 304) as long as power supply from host device 120/120A/120B/120C is uninterrupted or there is a user instruction to terminate operation (not shown). However, if in step 304 power sensor and switch 114/114B detects a power failure, then in step 306 power sensor and switch 114/114B switches power supply to the secondary power source—battery 116/116A or capacitor 146/146A—and notifies controller 111 about the power failure. Controller 111 then moves to using the secondary power source for saving all or part of the content of volatile memory 113 to nonvolatile memory 112. Operation of flash memory unit 110/110A/140/140A/140B is now suspended until, in block 307, power is renewed. If host device 120/120A/120B/120C has managed to save its own operational parameters, then in step 308 memory unit 110/110A/140/140A/140B copies the saved content from nonvolatile memory module 112 to volatile memory module 113 and attempts to resume normal operation. However, if this attempt is unsuccessful, the content saved in nonvolatile memory module 112 serves controller 111 in a recovery procedure to prepare flash memory unit 110/110A/140/140A/140B for fresh operation, as described in more detail in FIG. 4.

Figure 4:
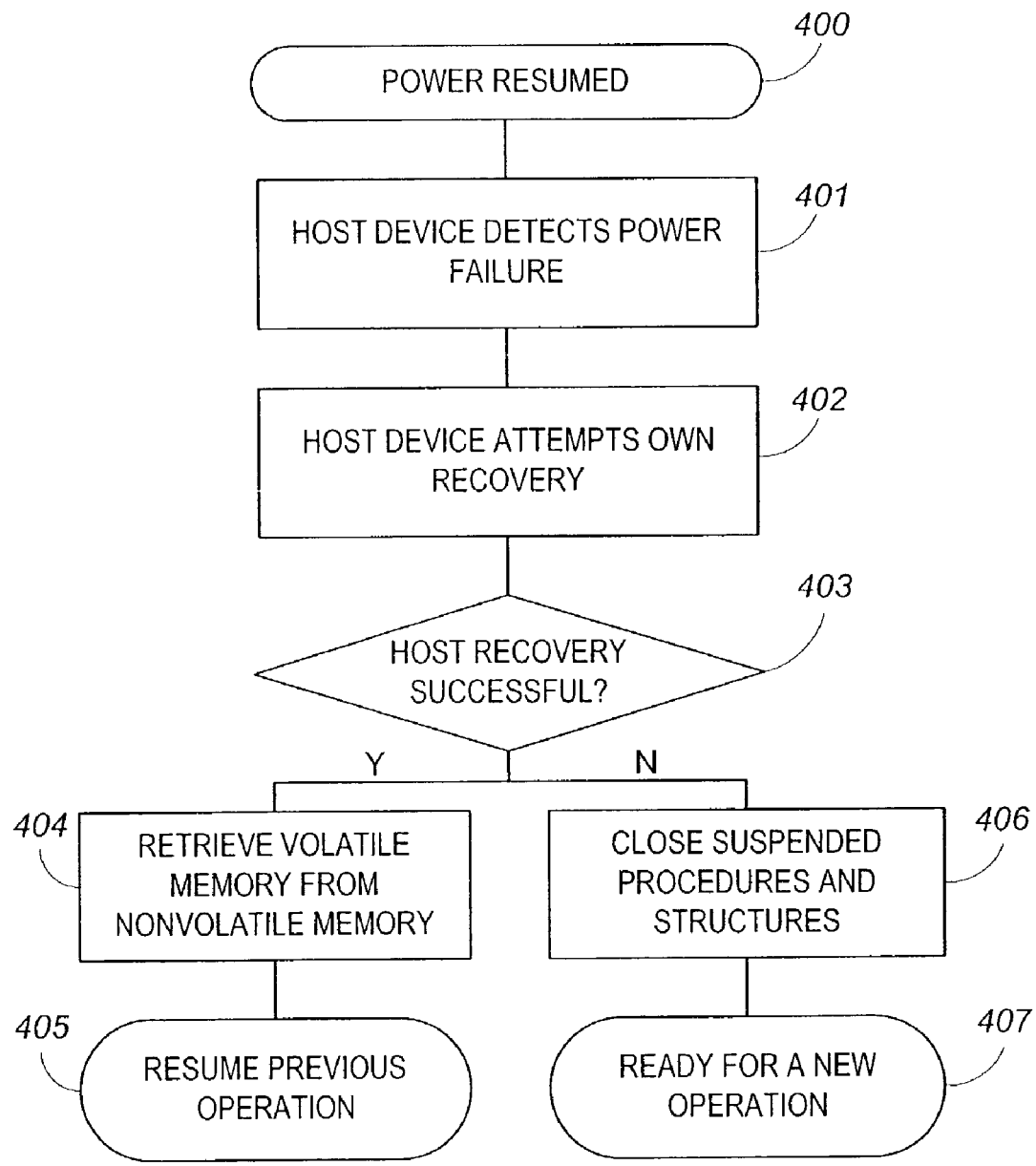
FIG. 4 is a flowchart describing a recovery following the operation of the present invention.

Reference is now made to FIG. 4, which illustrates in more detail the recovery of any of the embodiments of FIGS. 1 through 2B (step 308 of FIG. 3). In step 400, power to both host device 120/120A/120B/120C and flash memory unit 110/110A/140/140A/140B has resumed. In step 401 host device 120/120A/120B/120C detects that there has been a power failure and recovery is needed. In step 402 host device 120/120A/120B/120C attempts its own recovery. In step 403, host device 120/120A/120B/120C examines whether its own recovery has been successful. If so, then in step 404 the content of volatile memory 113 is recovered from nonvolatile memory 112, and flash memory unit 110/110A/140/140A/140B and host device 120/120A/120B/120C cooperate toward resuming operation from the point of interruption. If in step 403 host device 120/120A/120B/120C identifies that complete recovery has not been successful, then in step 406 controller 111 and host device 120/120A/120B/120C cooperate to use the saved data for closing suspended operations and resetting toward a fresh operation in step 407.

While the invention has been described with respect to a limited number of embodiments, it will be appreciated that many variations, modifications and other applications of the invention may be made.

What is claimed is:

1. A method of operating an appliance that includes a host device and a memory unit, the memory unit including a nonvolatile memory, the method comprising the steps of:
   (a) providing a volatile cache memory for caching data prior to writing said data to the nonvolatile memory; and
   (b) upon interruption of power to the memory unit, selectively writing at least a portion of said data of only one data class then cached in said volatile cache memory to the nonvolatile memory, said one data class being selected from the group consisting of system data and user data.

2. The method of claim 1, wherein said one data class is user data.

3. The method of claim 1, wherein said one data class is system data.

4. The method of claim 3, wherein said at least portion of said system data includes file allocation data.

5. The method of claim 3, wherein said at least portion of said system data includes a copy of a memory buffer that is used by the host device to accumulate user data.

6. The method of claim 3, wherein said at least portion of said system data includes a description of a status of the host device.

7. The method of claim 3, wherein said at least portion of said system data includes an identification of an interrupted operation.

8. A method of operating an appliance that includes a host device and a memory unit, the memory unit including a nonvolatile memory, the method comprising the steps of:
   (a) providing a volatile cache memory for caching data prior to writing said data to the nonvolatile memory; and
   (b) upon interruption of power to the memory unit, selectively writing only a portion of said data then cached in said volatile cache memory to the nonvolatile memory.

9. The method of claim 8, wherein said portion of said data includes only user data.

10. The method of claim 8, wherein said portion of said data includes only system data.

11. The method of claim 10, wherein said system data include file allocation data.

12. The method of claim 10, wherein said system data include a copy of a memory buffer that is used by the host device to accumulate user data.

13. The method of claim 10, wherein said system data include a description of a status of the host device.

14. The method of claim 10, wherein said system data include an identification of an interrupted operation.

15. A method of operating an appliance that includes a host device and a memory unit, the memory unit including a nonvolatile memory, the method comprising the steps of:
   (a) providing a volatile memory for storing only system data; and
   (b) only upon interruption of power to the memory unit, selectively writing at least a portion of said system data then stored in said volatile memory to the nonvolatile memory.

16. An appliance comprising:
   (a) a memory unit including:
      (i) a nonvolatile memory;

(ii) a volatile cache memory for caching data prior to writing said data to said nonvolatile memory;

(iii) a power sensor for receiving and detecting power supplied by a primary power source external to said memory unit, said power being for powering said memory unit; and (iv) a controller for, upon receiving an indication from said power sensor of an interruption of said power, selectively writing at least a portion of said data of only one data class then cached in said volatile cache memory to said nonvolatile memory, said one data class being selected from the group consisting of system data and user data.

17. The appliance of claim 16, wherein said one data class is system data.

18. An appliance comprising:
(a) a memory unit including:
   (i) a nonvolatile memory;
   (ii) a volatile cache memory for caching data prior to writing said data to said nonvolatile memory;
   (iii) a power sensor for receiving and detecting power supplied by a primary power source external to said memory unit, said power being for powering said memory unit; and
   (iv) a controller for, upon receiving an indication from said power sensor of an interruption of said power, selectively writing only a portion of said data then cached in said volatile cache memory to said nonvolatile memory.

19. An appliance comprising:
(a) a memory unit including:
   (i) a nonvolatile memory;
   (ii) a volatile memory for storing only system data;
   (iii) a power sensor for receiving and detecting power supplied by a primary power source external to said memory unit, said power being for powering said memory unit; and
   (iv) a controller for, only upon receiving an indication from said power sensor of an interruption of said power, selectively writing at least a portion of said system data then stored in said volatile memory to said nonvolatile memory.

20. A method of operating an appliance that includes a host device and a memory unit, the memory unit including a nonvolatile memory, the method comprising the steps of:
(a) providing a volatile memory for storing data; and
(b) upon interruption of power to the memory unit, writing to the nonvolatile memory at least a portion of said data of only one data class then stored in said volatile memory, said one data class being selected from the group consisting of system data and user data.

21. The method of claim 20, wherein said one data class is system data.

22. The method of claim 21, wherein said volatile memory is for storing only said system data.

23. A method of operating an appliance that includes a host device and a memory unit, the memory unit including a nonvolatile memory, the method comprising the steps of:
(a) providing a volatile memory for storing system data;
(b) only upon interruption of power to the memory unit, selectively writing at least a portion of said system data then stored in said volatile memory to the nonvolatile memory;
wherein said at least portion of said data includes file allocation data.

24. A method of operating an appliance that includes a host device and a memory unit, the memory unit including a nonvolatile memory, the method comprising the steps of:
(a) providing a volatile memory for storing system data;
(b) only upon interruption of power to the memory unit, selectively writing at least a portion of said system data then stored in said volatile memory to the nonvolatile memory;
wherein said at least portion of said data includes a copy of a memory buffer that is used by the host device to accumulate user data.

25. A method of operating an appliance that includes a host device and a memory unit, the memory unit including a nonvolatile memory, the method comprising the steps of:
(a) providing a volatile memory for storing system data;
(b) only upon interruption of power to the memory unit, selectively writing at least a portion of said system data then stored in said volatile memory to the nonvolatile memory;
wherein said at least portion of said data includes a description of a status of the host device.

26. A method of operating an appliance that includes a host device and a memory unit, the memory unit including a nonvolatile memory, the method comprising the steps of:
(a) providing a volatile memory for storing system data;
(b) only upon interruption of power to the memory unit, selectively writing at least a portion of said system data then stored in said volatile memory to the nonvolatile memory;
wherein said at least portion of said data includes an identification of an interrupted operation.

* * * * *